United States Patent [19]

Kelly et al.

[11] Patent Number: 5,060,290

[45] Date of Patent: Oct. 22, 1991

[54] ALGORITHM FOR GRAY SCALE ANALYSIS ESPECIALLY OF FRUIT OR NUTS

[75] Inventors: Patrick L. Kelly; Cynthia M. Klein, both of Bakersfield, Calif.

[73] Assignee: Dole Dried Fruit and Nut Company, Bakersfield, Calif.

[21] Appl. No.: 402,932

[22] Filed: Sep. 5, 1989

[51] Int. Cl.$^5$ ............... G06K 9/00; G06K 9/46; G06K 9/66; H04N 7/18
[52] U.S. Cl. ........................... 382/18; 382/1; 382/8; 358/106
[58] Field of Search ............... 382/1, 6, 8, 18, 51, 382/42; 358/106; 364/555; 356/430, 237

[56] References Cited

U.S. PATENT DOCUMENTS

| | | | |
|---|---|---|---|
| 3,932,839 | 1/1976 | Stephens | 382/18 |
| 4,122,951 | 10/1978 | Alaminos | 209/545 |
| 4,139,766 | 2/1979 | Conway | 377/6 |
| 4,231,014 | 10/1980 | Ponzio | 382/18 |
| 4,308,959 | 1/1982 | Hoover et al. | 209/563 |
| 4,414,566 | 11/1985 | Peyton et al. | 358/101 |
| 4,515,275 | 5/1985 | Mills et al. | 209/558 |
| 4,606,065 | 8/1986 | Beg et al. | 382/18 |
| 4,645,080 | 2/1987 | Scopatz | 358/106 |
| 4,687,107 | 8/1987 | Brown et al. | 209/556 |
| 4,691,231 | 9/1987 | Fitzmorris et al. | 358/106 |
| 4,735,323 | 4/1988 | Okada et al. | 382/18 |
| 4,741,042 | 4/1988 | Throop et al. | 382/470 |
| 4,744,035 | 5/1988 | Hashim | 364/470 |
| 4,903,310 | 2/1990 | Takeo et al. | 382/51 |
| 4,959,870 | 9/1990 | Tachikawa | 382/18 |

Primary Examiner—Michael Razavi
Assistant Examiner—Michael Cammarata
Attorney, Agent, or Firm—Townsend and Townsend

[57] ABSTRACT

A technique of characterizing histograms using unique serial code words for discrimination between look alike acceptable and unacceptable items. The histogram is processed by normalizing the captured histogram image pixels preferably to the largest pixel size image normally encountered. Thereafter the histogram is attributed. The preferred embodiment related to a gray scale histogram (as distinguished from a histogram relating to area, length, width, perimeter, or aspect ratio) and successively attributes each histogram into peak location, range of histogram, peak value, right of peak value, and a selected gray scale count. For each attribute, an arbitrary range of codes is generated to break the classification of each attribute into manageable two-digit code categories. These two-digit code categories are typically written to a serial look-up table opposite the actual histogram value and extracted from the look-up table in real time to create two-digit code words. The two-digit code words are in turn concatenated in real time to create a unique serial word out of the successive codes from each attribute of each individual histogram. In the case of product acceptance and rejection, the unique serial code words of acceptable product is nonredundantly written to a library with word recognition indicting acceptable product. In grading product, the unique serial code words are provided to identify the product or defect which can thereafter be summed or otherwise processed for generating the desired product grades.

12 Claims, 6 Drawing Sheets

ALGORITHM FOR GRAY SCALE ANALYSIS ESPECIALLY OF FRUIT OR NUTS

BACKGROUND OF THE INVENTION

1. Field of the Invention

This invention relates to histograms and in particular to gray scale histograms and an algorithm for attributing the gray scale histograms to enable the sort of look alike acceptable and unacceptable items. The disclosed techniques find preferred use in the sorting of almonds.

2. Statement of the Problem

This invention is directed to the utilization of histograms as acquired by a machine vision system. Such machine vision systems are well known in the prior art. Specifically, they commonly include a passing stream of product and a video camera. The video camera takes an image and each individual image is thereafter analyzed with a histogram being produced.

In the present case, a gray scale histogram is preferred. The reader will realize that histograms relating to size, shape or other features may be used. For example, a histogram related to area, length, width, perimeter or aspect ratio can be used. Such use can be alone or combined with gray scale histograms.

The technique here disclosed is utilized for speed. Processing speed in excess of 175 items a second is required. When it is realized that look alike acceptable and unacceptable items must be sorted at such a speed, the difficulty encountered in distinguishing one histogram of an acceptable item from a similar histogram of an unacceptable item can be appreciated.

Decision criteria currently being utilized work well if the histogram signature of the desirable item, such as a fruit or nut, falls inside or outside a set of preferred ranges that define the desirable product from the undesirable product. Such an example can be seen with respect to FIG. 4. Unfortunately, in many cases, the histogram signature of agriculture products and their associated defects cannot be defined by maximum or minimum reference values. Attempts at utilizing various statistical techniques such as quadratic or linear discriminate analysis have not proven robust enough due to the amount of variation present in acceptable and unacceptable items within a stream of agricultural products.

Ranges have proven particularly unsatisfactory. It has been common in the prior art to create for each portion of the histogram range values which if satisfied indicate acceptable product and which if not satisfied indicate unacceptable product. Typically, these range values are placed together in series. An acceptable product must therefore fall within a series of acceptable ranges.

Such a sorting scheme does not acceptably operate when a sort of look-alike items is required. For example, assuming that the series of ranges are chosen so that only acceptable items will ultimately clear all of the ranges, the rejected items will be found to include many acceptable items. The difficulties encountered in sorts of look alike items can be emphasized by referring to FIGS. 4, 5, and 6.

Figure 4:
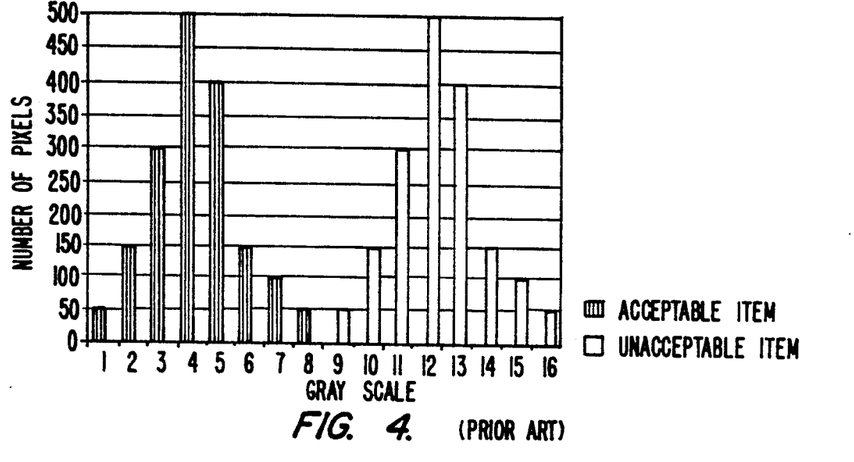
FIG. 4 is a prior art comparison of acceptable and unacceptable histograms having no overlap.

FIG. 4 is a gray scale histogram depicting the gray shade distributions of an acceptable item and an unacceptable item. The histogram contains 16 shades of gray, shade 1 being black and shade 16 being white. It can be seen that the acceptable item is much darker than the defective item. It can be further seen that the distributions of each of the paired histograms for the acceptable item and the unacceptable item do not overlap. The decision criteria to separate the good from the bad in this case is simple. For example, if pixels are present in gray level 9 or higher, rejection can occur; otherwise, the product will be accepted. In the acceptable and unacceptable items characterized by this histogram there is such a significant difference that defective items can be rejected without worrying about the mixing of acceptable product in the rejected items. Unfortunately this is an idealistic representation of the type of condition that would be hoped for. It is not the kind of condition that is found in separating acceptable product from unacceptable product especially in the agriculture industries.

Figure 5:
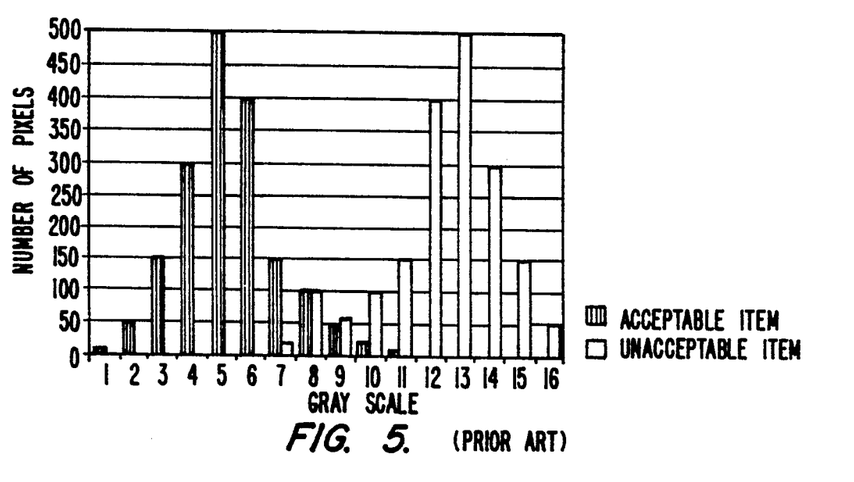
FIG. 5 is a prior art comparison of acceptable and unacceptable histograms having shoulder overlap on the common side of both histograms.

Referring to FIG. 5, a more common condition of histogram occurrence is there shown. Paired histograms are shown with an area of overlap which represents an area of indecision. Accepting or rejecting purely on the range of the histogram will result in error, this error being one of commonality. For example, and utilizing the range, if all items having gray scales of 7 through 11 are rejected, much acceptable product will likewise be rejected. It is this difficulty which causes a series of arbitrary ranges to either reject much acceptable product, or alternately to accept product that should be otherwise rejected, rather than to achieve the objective of minimizing both types of errors. Heretofore in the prior art vision systems have asked the user to accept tradeoffs that are simply not practical or would seriously jeopardize the economic justification of any machine vision recognition product.

Figure 6:
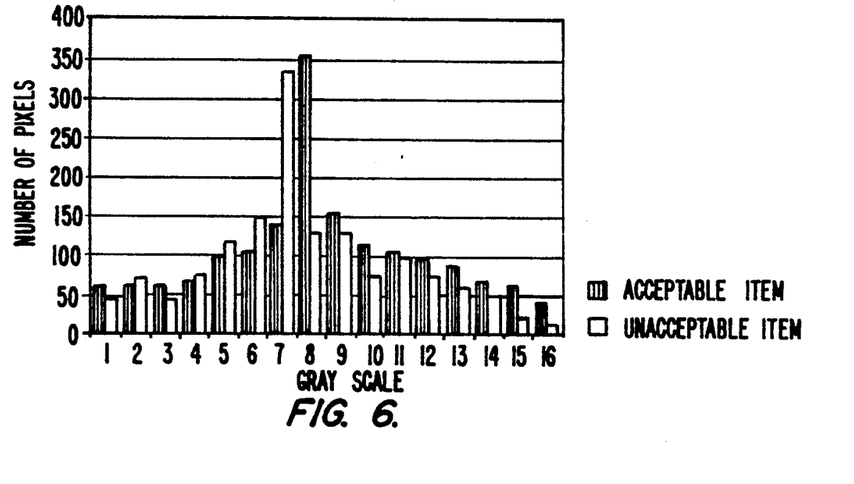
FIG. 6 illustrates the overlap of the histograms of the classification scheme similar to that illustrated herein.

Referring to FIG. 6 and by utilizing a series of ranges, the inspection task can be said to be literally unachievable. The gray scale histogram of the desired item is on average the same as the gray scale histogram of the undesirable item. This is the problem area to which the present invention is directed.

No one single set of decision criteria would apply in this case because the decision criteria stated will reverse itself many times. That is to say each criteria will include on either side of its dividing line both acceptable and unacceptable items.

Traditionally, agriculture products have been inspected by people with obvious success. The human brain utilizes multiple inputs from the eye that include, but by no means are limited to, color, shades of color, combinations of color, shade, shape, size and many other factors. The human brain contains in memory the person's experience of what all of the unacceptable objects look like. Quick comparison is made from the image of the eye to the retained experience criteria in the human memory. If the information from the eye is not contained in experience memory, the human can decide rationally to accept or reject the item.

In the prior art, it can been common to utilize gray scale histograms. Compared to the conventional human sorter, a gray scale histogram is essentially color blind.

Sorting of almonds is the preferred embodiment for our invention. Specifically acceptable almonds must be classified away from almonds which are spoiled, almonds which remain wholly or partially within their shells (in shell), fragments of the outer hull which encloses the in shell almond (hull), mud balls from the orchard floor, rocks from the orchard floor, and almonds that have been damaged during the hulling and shelling process (chips). With the exception of the chips, the types of foreign materials encountered in the separation of almonds happen to be among the most difficult agriculture objects to separate by machine vision. Some understanding of the harvest of almonds and their initial processing can be helpful.

Typically, when almonds are ripe, the nuts mature within hulls. The almond trees are shaken and the respective hulls fall to the orchard ground. Thereafter, the hulls are swept into rows and thereafter collected from the orchard floor.

The collected hulls are thereafter subject to a hulling process and mechanical sorting to separate leaves, twigs, and large debris from the relatively small almonds and other small contaminants. There results a single size mass containing mainly almonds but having impurities, such as in shell almonds, chips, mud balls, and rocks, all intermixed therein. It is to this mixture that the classification of this invention is directed.

SUMMARY OF THE INVENTION

In machine vision recognition, which include the prior art techniques of line scanning of a serial stream of individual product items by video and generating corresponding serial individual histograms of each individual passing product item, a technique of characterizing the histograms is disclosed. The technique realizes unique serial code words for discrimination between look alike acceptable and unacceptable items. In the preferred embodiment of this invention, almonds as acceptable items are separated from look-alike unacceptable items including spoiled almonds, in shell almonds, almond hulls, rocks and mud balls. The histogram is processed by normalizing the captured histogram image pixels, preferably by multiplying each histogram category to generate a normalized histogram equivalent to the largest pixel size image normally encountered. Thereafter the histogram is attributed. The preferred embodiment relates to a gray scale histogram (as distinguished from a histogram relating to area, length, width, perimeter or aspect ratio) and successively attributes each histogram into peak location, range of histogram, peak value, right of peak value, and a selected gray scale count. For each attribute, an arbitrary range of codes is generated to break the classification of each attribute into manageable two digit code categories. These two digit code categories are typically written to a serial look-up table opposite the actual histogram value and extracted from the look-up table in real time to create two digit code words. The two digit code words are in turn concantinated in real time to create a unique serial word out of the successive codes from each attribute of each individual histogram. In the case of product acceptance and rejection, the unique serial code words of acceptable product is nonredundantly written to a library with word recognition indicating acceptable product. In grading product, the unique serial code words are provided with the identifier of either the product or (type of) defect which can thereafter be summed or otherwise processed for generating the desired product grades. The produced library of unique serial code words for grading product has a random characteristic. Conventional word sorts on the library distribute in random fashion the sorted words for the various classes of items distinguished by the algorithm.

Other Objects, Features, and Advantages

An object to this invention is to create a series of histogram images capable of being classified into closely related but different serial words. As a first step in the disclosed process, individual histogram images are normalized, preferably to the largest images present in the processing.

An advantage of this normalization step is that all gray scale histograms are placed on comparable size factors. Accordingly, variation in image sizes does not effect the gray scale unique serial words ultimately produced for discrimination between acceptable and unacceptable items.

A further object to this invention is to disclose within chosen attributes the grouping of the attributes into groups of manageable size. As to each of these groups, there are assigned arbitrary code words, preferably two digit numbers.

An advantage of this aspect of the invention is that the individual attributes of the normalized histogram are broken into manageable categories. These manageable categories can be placed in a look-up table. Opposite discrete values in the look-up table can be placed the two digit word, the words individually bracketing all integers within the category. There results a real time production of arbitrary two digit code words from any given attribute in the histogram.

A further object to this invention is to disclose the concatenation of two digit code words into a unique serial code word.

According to this aspect of the invention, the two digit code words from many attributes are combined. For example, in the preferred embodiment of this invention, four two digit code words combining five different attributes are individually created. These code words are concantinated in an eight digit serial word which word is unique and can be identified with acceptable and unacceptable product.

An advantage of the unique code word is that as to unacceptable product, specific classes of unacceptable product can be itemized. Such classes can be utilized for grading product stream as to quality as well as for the acceptance and rejection task herein set forth.

A further object to this invention is to disclose a process for creating and nonredundantly writing the unique serial code words in accordance with this invention to a look-up table. In accordance with this aspect of the invention, known acceptable and/or unacceptable items are passed through the video recognition system. Unique serial code words recognized by the video system are written to memory in a sorted fashion. The written sorted unique serial code words are eliminated wherever redundant. Machine vision classification and generation of unique words continues until all recognized words are redundant. When all recognized words are redundant, the assumption is made that all possible code words have been recognized.

An advantage of this aspect of this invention is that acceptable product can be passed through the machine vision system and histogram attributed in accordance with the teachings of this invention. The code words of acceptable product only can be written to memory. Writing of the serially words for acceptable product will continue until all newly generated words are redundant.

A further advantage of this look-up table of acceptable words is that the minute an unacceptable word is even partially recognized, rejection of product can occur. Accordingly, the rejection of product can occur in the shortest possible time.

A further object to this invention is to disclose a preferred optical embodiment for the residency of this invention. According to this aspect of the invention, eight serial streams of singulated almond product are passed between paired cameras with the major surface of the product preferably being viewed from both sides. A separate histogram is created from the image of each side of the falling product. Histogram analysis occurs and classification of the falling product between an acceptable gathered group and a rejected gathered group can occur in less than a three inch fall from the end of the singulating conveyor. Accordingly, processing at high speed results.

An advantage of the automated vision system of this invention is that, unlike a human, the optical system herein disclosed does not tire.

DETAILED DESCRIPTION OF THE DRAWINGS

Other objects, features and advantages of this invention will become more apparent after referring to the following specifications and attached drawings in which.

Figure 1:
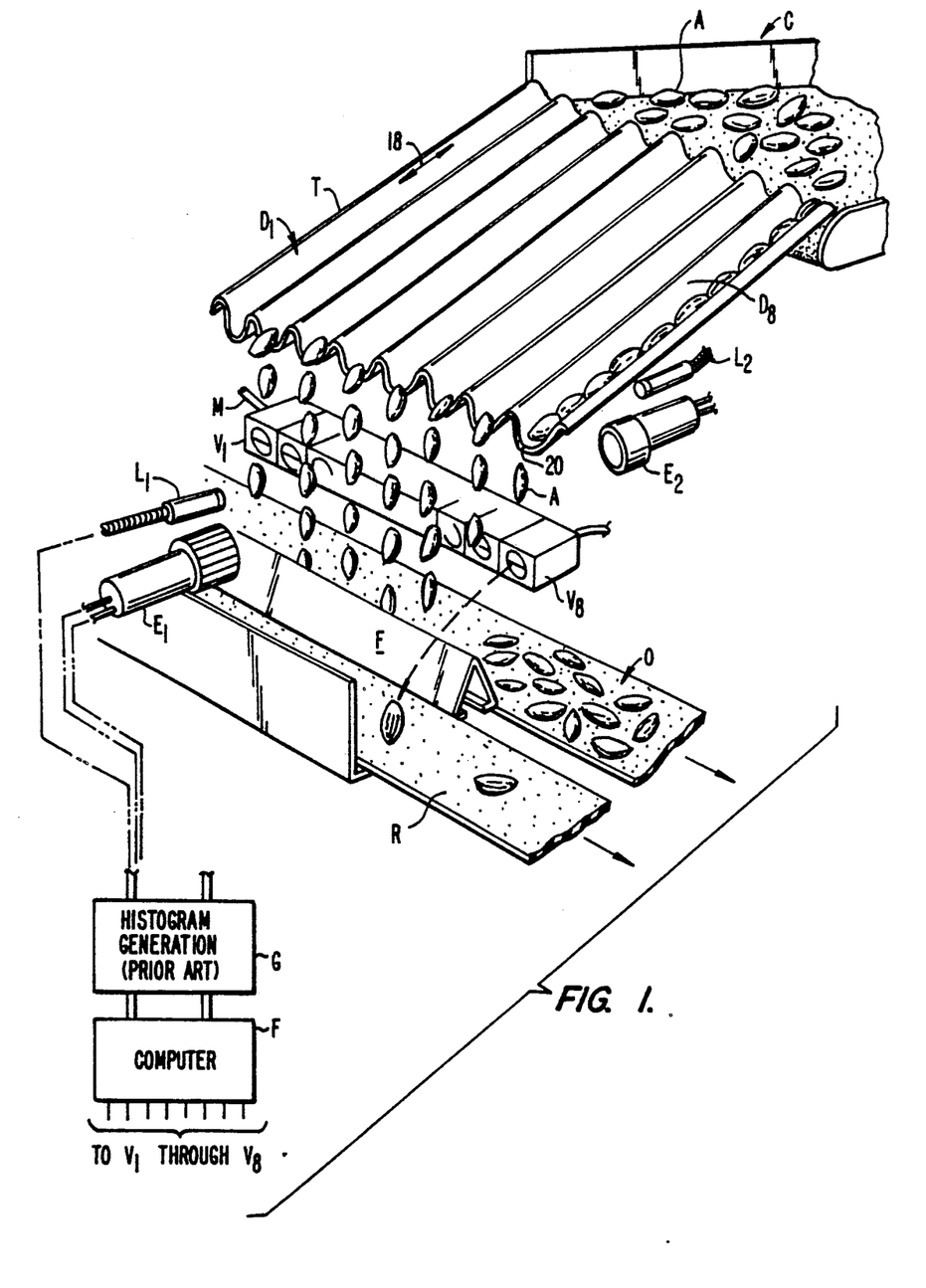
FIG. 1 is a perspective view of an automated inspection system for almonds illustrating a conveyor passing almonds to a singulating vibratory table with the almonds serially falling in a stream eight wide past paired cameras for the capturing of a histogram image and with acceptable and unacceptable almonds being directed to either side of a separating fence by computer actuated air reject nozzles.

Referring to FIG. 1, an apparatus for the optical inspection of eight falling streams of almonds is illustrated. Specifically, a conveyor C conveys a serial stream of almonds A to a vibratory table T having eight discrete channels D1-D8. The vibratory table vibrates in the direction of almond conveyance (see arrow 18) and causes the randomly conveyed almonds A on the table to travel in a singulated path down each one of the respective channels D1-D8. The almonds at the end of the vibratory table (see arrow 20) fall in a serial stream past two cameras E1 and E2. Respective cameras E1 and E2 have the almonds illuminated by lights L1 and L2. A series of lights furnish the falling almonds with uniform illumination, although only one such light is shown here for each camera.

It will be seen that the almonds are disposed at the end of the vibratory table 18 with their major surfaces normal to the vibratory table T. This being the case, the almonds dispose themselves in passing the respective cameras E1 and E2 with their major surfaces exposed to the cameras.

The cameras E1 and E2 herein utilized are Fairchild 1300R line scan camera sold by the Fairchild Corporation of Sunnyvale, Calif. The respective cameras image a solid line the full length of the eight streams of serially falling almonds. An image is captured of each almond as it falls by the line of scan. This image from cameras E1 and E2 is passed to its respective histogram generator G well known in the prior art. From the histogram generator, serial images of the passing almonds are analyzed and respective gray scale histograms produced. The respective histograms are received in a computer F, which computer F, preferably a Xycom Computer Model XVME-602 68020, Saline, Mich. Preferably, this computer includes a numerical program including the capability of storing and accessing numeric look-up tables as here disclosed. Such programs are well known in the art and will not be repeated here. It is into such a numerical program that the exemplary attributing program illustrated in FIG. 2 is utilized.

Histograms generating vision systems are well known. Consequently, any number of machine vision systems will work with this invention. The reader may contact representative manufacturers of histogram generating apparatus through the Machine Vision Association, a division of the American Society of Manufacturing Engineers of Dearborn, Mich.

Figure 2:
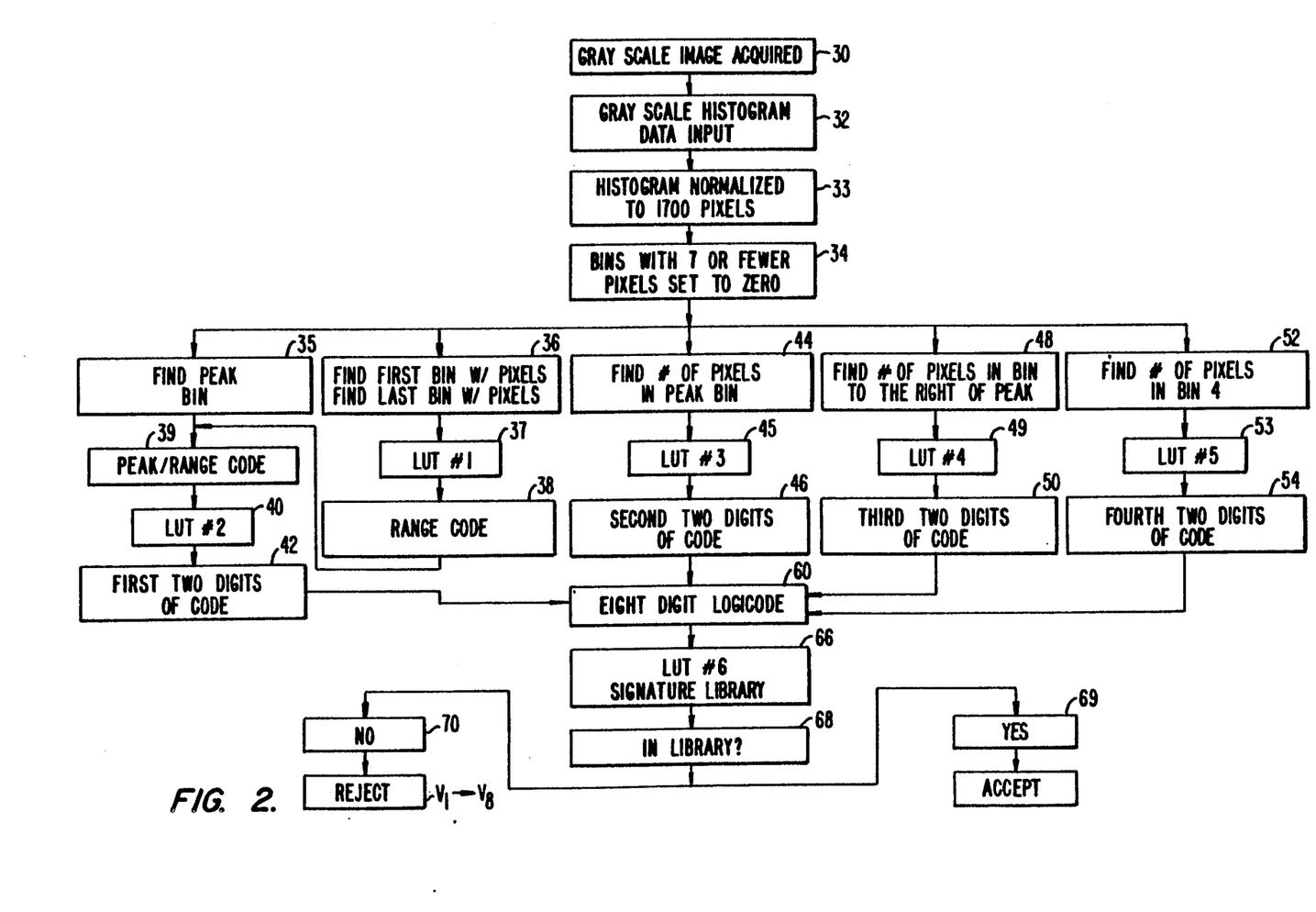
FIG. 2 is a block diagram of the logic capable of creating the unique eight digit word for recognition of the acceptable and unacceptable product, the signature library here illustrated containing only those unique serial code words of acceptable product.

Referring to FIG. 2, the discrete steps of the illustrated program are illustrated. At step 30, the gray scale histogram image is acquired. This image will contain, dependent upon the area of the falling almonds A, an arbitrary number of pixels, these pixels usually being less than 1700 in number. At step 32, the acquired image is input. At step 33, the image is normalized to 1700 pixels. Thus each analyzed image includes a standard number of pixels.

The reader will understand that normalization is particularly desirable in the case of gray scale histograms. Such normalization eliminates considerations of scale from the shade sorting problem created by this invention. Such normalization may not be desired when sorting according to size and shape occurs.

Figure 3:
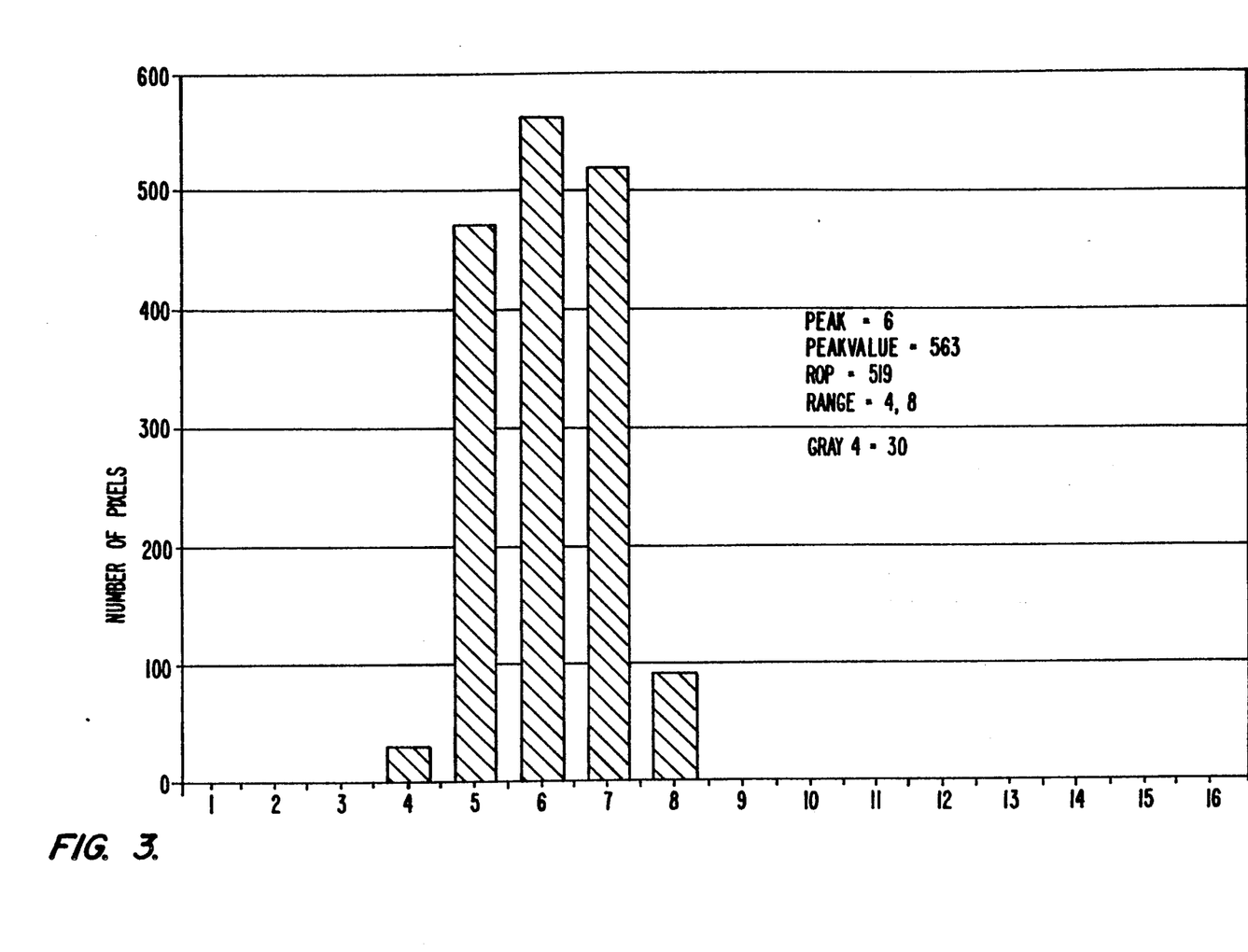
FIG. 3 is a typical histogram being assigned a specific logic code in accordance with this invention, the logic code using the five attributes of range, peak value, right of peak range, and gray scale 4.

Referring to FIG. 3, it can be seen that a histogram includes 16 discrete bins. These bins include 1 (dark) to 16 (white). It has been found that for the normalized histogram, 7 or fewer pixels within any given bin constitute noise. This being the case, at step 34, all bins with 7 or fewer pixels are set to zero.

The reader will realize that internal computer handling of the disclosed histograms will be entirely numeric. Typically, processing will occur in numeric arrays. For the convenience and the understanding of the reader, this description will follow the graphic format only. It will be left to the ordinary skill to effect the conversion of this imparted information into numeric arrays.

Figure 7:
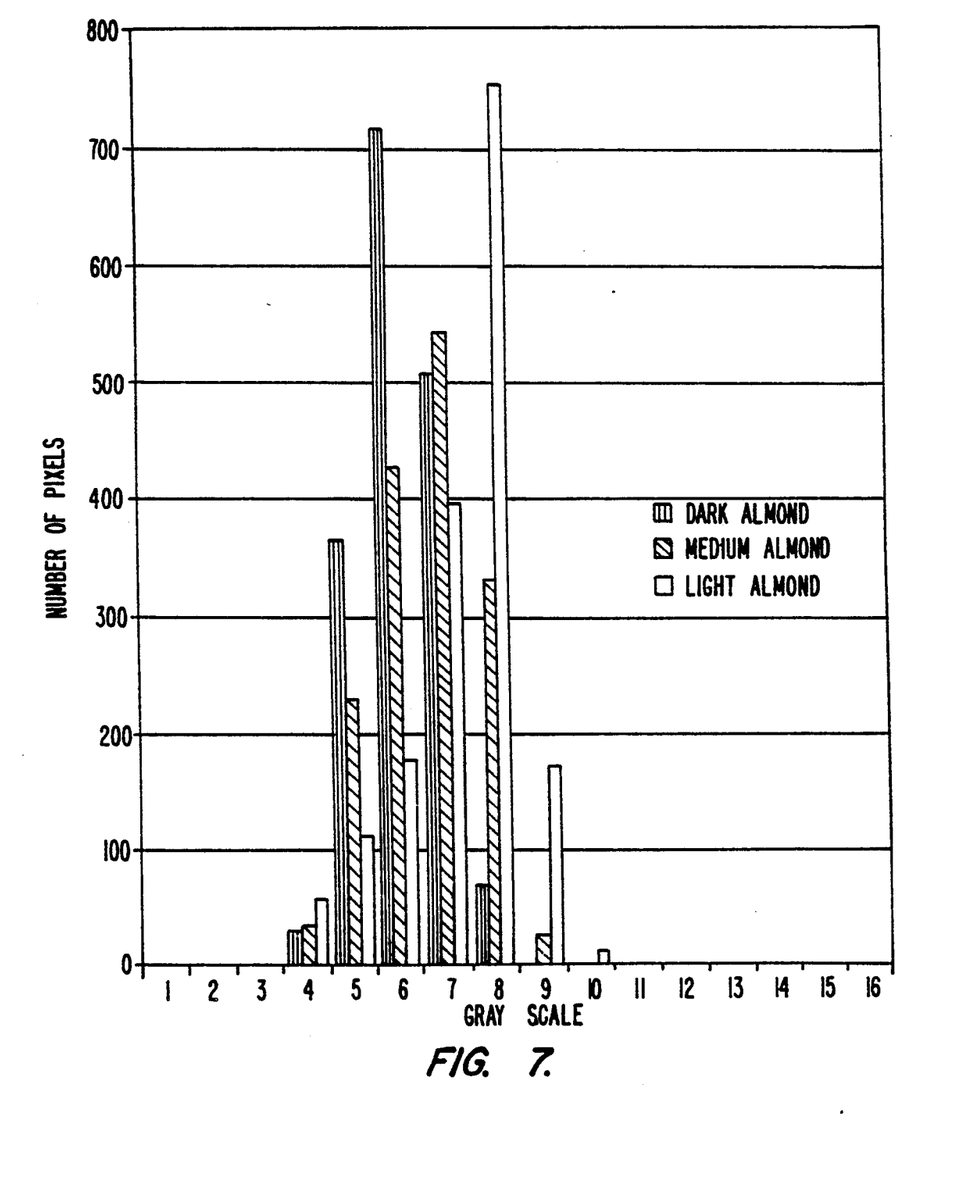
FIG. 7 is a histogram plot of dark, medium and light almonds, the plot illustrating the overlap and pixel distribution characteristics of even acceptable product.
Figure 8:
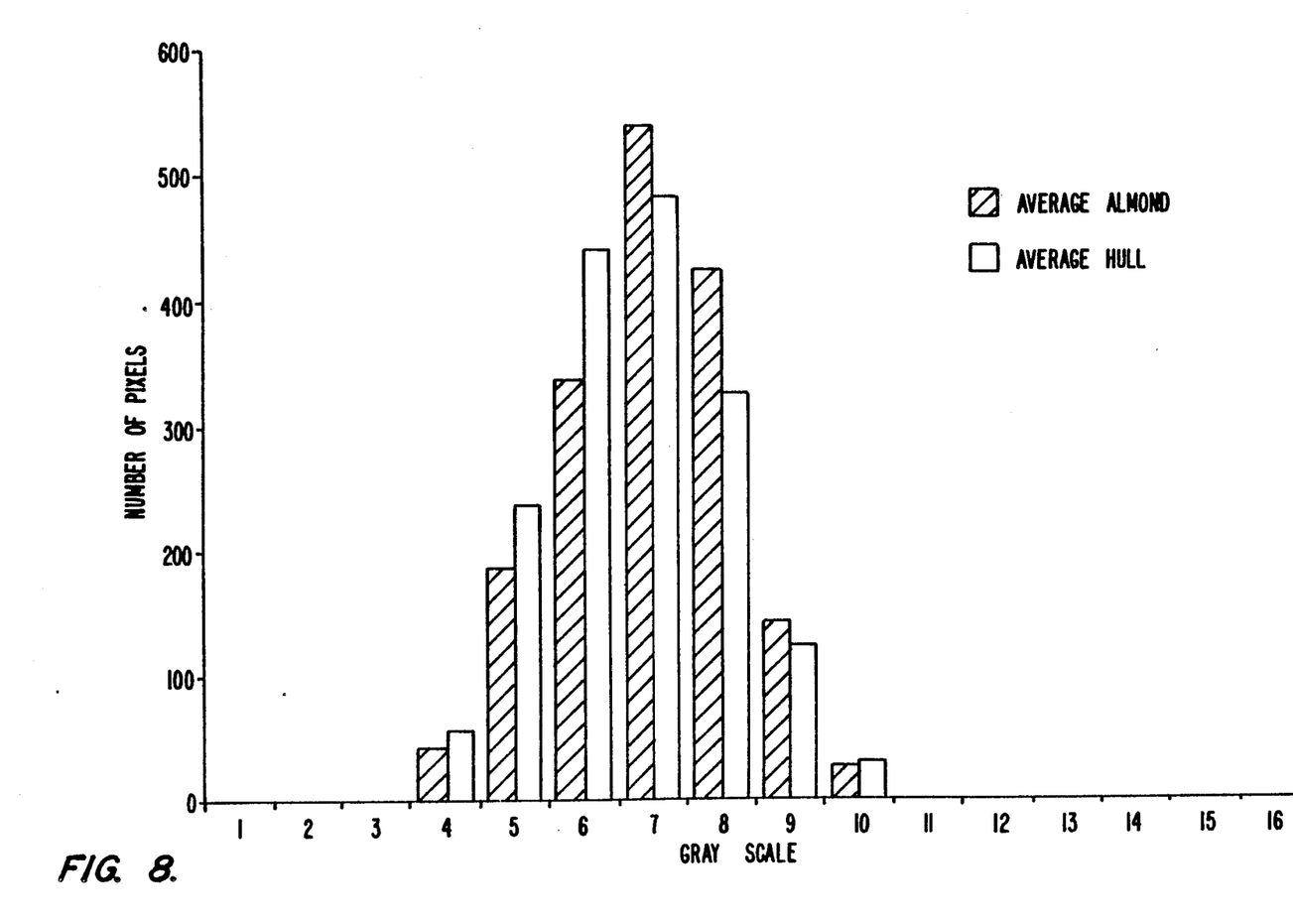
FIG. 8 is a gray scale average histogram for the average acceptable almond and the average rejectable hull fragments, the histogram illustrating a typical look alike histogram characteristics of the illustrated sort.

The difficulty in achieving the sort has previously been set forth with respect to FIG. 6. FIGS. 7 and 8 further set forth the complications of the areas of the sort. FIG. 7 sets forth the various shades of acceptable almonds together with their selected arbitrary ranges. It can be seen that considerable overlap exists. Likewise, the particular code words that can be generated on an exemplary basis are set forth. These code words when numerically sorted spread themselves over a large range.

Second, and with respect to FIG. 8, the problem of almond sort from hull is emphasized. Specifically, it can be seen that there is considerable overlap between the average histograms for the product. The average code words can be seen to be relatively close in numerical range.

Having set forth these specific examples, the product sorting steps of this invention will now be detailed.

First, the peak bin is identified. Referring to FIG. 3 it can be seen that the peak bin is bin 6. Such identification occurs at step 35. Referring to step 36, the first bin with pixels and the last bin with pixels are identified. This range of bins addresses a look-up table 37 and generates an arbitrary range code 38. The range code at step 38 is combined with the peak bin from step 35 to generate a peak range code at 39. The peak range code at 39 is addressed to a look-up table 40 which generates the first two digits of a code at 42. Thus, the two digits appearing at 42 are both a combination of the peak bin value and the overall range.

The peak bin 35 will be the most predominating shade of gray on the object. A very dark object would have a peak nearer to gray level 1. A very light object would have a peak nearer to gray level 16.

The range identified in steps 37 and 38 has a combination of the first gray level bin that contains pixels (over 7) and the last gray level bin that contains pixels (over 7). In terms of human inspection characteristics, this attribute would represent the combination of gray shades on the object.

It will be understood that at the peak range code resulting at 39, and the arbitrary two digits resulting from look-up table 40, will be an overall characterization of both the peak of the histogram and its left-right position on the histogram scale of 1 to 16.

At step 44, the peak number of pixels in the peak bin is found. At step 45, a look-up table generates an arbitrary two digit code and provides the second two digits of an eight digit unique code. (See 46)

At step 48, the number of pixels in the bin to the right of the peak are identified. These pixels are observed in a look-up table 49 and the third two arbitrary digits generated in a look-up table 50.

Finally, and at step 52, the number of pixels in gray bin 4 is identified and referenced to a look-up table 53. The fourth two digits of a logic code are identified in step 54.

An output register 60 receives the arbitrary eight digit word. In the operative embodiment, the word is output to a signature library 66. In the operative embodiment in FIG. 1, signature library 66 is loaded non-redundantly with all arbitrary eight digital serial words in a sorted order. In the preferred embodiment illustrated, only words indicating acceptable product are stored in the signature library. At step 68, it is determined whether such words exist in the library. If the words exist at step 69, product acceptance occurs. Alternately, if the words do not exist at step 70, product rejection occurs.

Returning back to FIG. 1, acceptance and rejection occurs through discrete air nozzles V1-V8. These nozzles receive air from a manifold M. The air from manifold M causes almonds A which would normally fall on an output conveyor 0 to pass on the opposite side of a fence F to a reject conveyor R. Rejected product will pass down reject conveyor R. Product passing inspection will pass down conveyor O.

It will be seen that the entire disclosed logic utilizes nothing but look-up tables. Consequently, it is a relatively fast processing procedure, the processing for any individual almond being in the order of microseconds. Specifically, and before any almond (or other suspect particle) has fallen three inches, the decision of acceptance or rejection is made and the respective nozzle causes acceptance or rejection.

In the preferred embodiment of this invention, it is preferred to write each possible value of each of the respective peak bins (step 35), total histogram range (step 36), number of pixels in a peak bin (step 44), pixels to the right of peak (step 48), and total number of pixels in bin 4 (step 52), in a look-up table. It has been found that it is desirable to load computer memory in the disclosed BMDP program with tables containing the corresponding digits indicating the actual values, and opposite the actual values, the particular arbitrarily assigned code word. A program which will enable such loading is attached as an Appendix to this patent application.

In the process of classifying a specific histogram, such as that illustrated in FIG. 3, the range is first utilized. As the last bin with pixels is bin 8, and the first bin with pixels is bin 4, reference to the accompanying Look-Up Table 1 generates the arbitrary digit 3.

TABLE 1

| LOOK-UP | | |
|---|---|---|
| First Bin with Pixels | Last Bin with Pixels | Range Code |
| 4 | 6 | 1 |
| 4 | 7 | 2 |
| 4 | 8 | 3 |
| 4 | 9 | 4 |
| 4 | 10 | 5 |
| 4 | 12 | 6 |
| 4 | 14 | 7 |
| 4 | 15 | 8 |
| 5 | 5 | 9 |
| 5 | 6 | 10 |
| 5 | 7 | 11 |
| 5 | 8 | 12 |
| 5 | 9 | 13 |
| 5 | 11 | 14 |
| 5 | 13 | 15 |

The reader can refer to the appended program with the title "PKRANGE". It will be seen that the possible peak gray level, plus the range code (from table 1) encountered in the almond sort problem, are all assigned arbitrary codes from 10 through 45. These codes coincide with step 36 and look-up table 37 of this invention. As previously explained, the peak gray level is then added to the arbitrary range code. Look-Up Table 2 is as follows:

TABLE 2

| LOOK-UP | |
|---|---|
| Peak Gray Level Plus Range Code | 1st 2 Digits of Logicode |
| 62 | 10 |
| 63 | 11 |
| 64 | 12 |
| 66 | 13 |
| 67 | 14 |
| 68 | 15 |
| 69 | 16 |
| 610 | 17 |
| 611 | 18 |

TABLE 2-continued

| LOOK-UP | |
|---|---|
| Peak Gray Level Plus Range Code | 1st 2 Digits of Logicode |
| 612 | 19 |
| 614 | 20 |
| 72 | 21 |
| 73 | 22 |
| 74 | 23 |
| 78 | 24 |
| 79 | 25 |
| 710 | 26 |
| 711 | 27 |
| 712 | 28 |
| 713 | 29 |
| 714 | 30 |
| 716 | 31 |
| 83 | 32 |
| 84 | 33 |
| 89 | 34 |
| 810 | 35 |
| 811 | 36 |
| 812 | 37 |
| 814 | 38 |
| 815 | 39 |
| 816 | 40 |
| 910 | 41 |
| 912 | 42 |
| 913 | 43 |
| 914 | 44 |
| 916 | 45 |

It can thus be seen that the output of Look-Up Table 2 at step 40 is a combination. It is the combination of the total range of pixels encountered, together with the peak height. This code generates the first arbitrary two digits of the logic code. Using this Look-Up Table 2, the range code of 3, combined with the peak bin 6, generates the arbitrary code 11. This generates the first two digits of the "Logicode".

The cases of step 44 and look-up table 45 are listed in the appended program under peak value. It can be seen that the peak values are assigned specific ranges for their respective arbitrary codes. These respective ranges render manageable the attribute of peak value. At the same time, output the second two digits of an arbitrary code word. For example, assuming a peak value of 563, the arbitrary code 17 is generated.

Likewise, and in the appended program, under the designation "ROP," various readings for right of peak summations are utilized. Again, for every discrete value that can possibly be encountered a number is written to the register 60. As before, the code extends over the given range of numbers. For example, and in the case of FIG. 3, in the first step of the right of peak (ROP) section of the program, it can be seen that for all pixel counts greater than 0 and less than or equal to 39, the arbitrary code word 10 is assigned. In the case of FIG. 3, and assuming a value of ROP of 519, the arbitrary code word 23 is generated.

Likewise, and finally, the number of pixels in gray level 4 is determined. Again, at a look-up table 53 arbitrary two digit codes are assigned. For example, and referring to the first step, where the gray level 4 equals 0, then the arbitrary code word 10 is assigned. In the case of FIG. 3, and assuming a gray level 4 count of 30, the arbitrary code 17 is generated.

The reader will understand that the generation of the disclosed code words are purely arbitrary. These arbitrary designations are made after an empirical examination of the visual recognition problem to be encountered. Once these arbitrary designations are made, then the generation of the signature library at 66 can occur.

The steps necessary for the generation of the signature library can be easily understood with reference to FIG. 1.

With respect to FIG. 1, acceptable product only is passed between the respective cameras E1 and E2. The histogram data is generated and the words created are written to signature library 66 (see FIG. 2). The words created are written in a nonredundant fashion. That is to say, where two words are precisely the same, the word is only written once to the library.

Writing of words for serially passed acceptable product continues so long as library 66 receives new words. Eventually, all words generated by the apparatus of FIG. 1 are old or redundant. The assumption is then made that all possible combinations of acceptable product words which the system is capable of recognizing reside in the table in step 66.

Once the signature library is loaded, product sorting can easily occur. Specifically, and by determining whether the code for an acceptable product resides in the table at 68, either acceptance at step 69 or rejection by actuation of an air valve V1 through V8 will occur (step 70). As the wiring of the value responsive to the computer decision is well within the level of ordinary skill, further illustration of this technique will not be made.

Experience with the program herein disclosed has indicated that discrete defects are individually identified by the unique serial word herein generated. Accordingly, the reader will understand that the library illustrated at 66 can contain words which indicate both acceptable and unacceptable product. Furthermore, the unacceptable product itself may be classified. For example, in shell items can be separated from rocks, mud balls, shell fragments, and other impurities commonly found within the almond crop of the preferred embodiment herein.

The reader will appreciate that the disclosed scheme of attributing is only limited by the speed of the computer. Selecting attributes for a particular sorting problem must be arbitrarily addressed to the sort, however the attributes utilized can be many more than the five used in the preferred version of the process illustrated here.

An important characteristic exists in the sorted library words for product grading, where the words identify almonds, in shell almonds, chips, rocks, etc. Normally, one would expect like words to identify like products. Thus, a numerical sort would generally classify the acceptable product in one area of the sort, and generally classify the unacceptable product in another area of the sort. That does not happen with this technique. Taking selected areas of a numeric sort, it can be seen that acceptable and unacceptable items are classified next to one another.

It is not practicable to set forth an entire table here. However, a segment of such a table of sorted words is set forth together with the types of materials identified.

| | |
|---|---|
| 38161924 | Almond |
| 38201922 | Almond |
| 38251225 | Almond |
| 38921621 | In Shell Almond |
| 39111221 | Chip |
| 39121816 | In Shell Almond |

-continued

| | |
|---|---|
| 39140220 | In Shell Almond |
| 39151624 | Chip |
| 39151719 | Almond |
| 40131620 | Rock |
| 40151717 | Almond |

It can be seen from the above example, that the unique serial code words here utilized do not necessarily appear to obtain any logical order. Instead, the words are custom tailored to the individual recognition process required.

The appended code is written in BMDP Statistical Software, a product of BMDP Statistical Software of Los Angeles, Calif. Virtually any program written can be used that will fill a look-up table with each discrete value for a range of value and write opposite the value the arbitrarily selected code.

APPENDIX

Version: 1988 (IBM PC/DOS)
Manual: BMDP Manual Vol. 1 (August, 1988); Vol. 2 (December, 1988).
Use 1983 or 1985 edition until 1988 becomes available.
Digest: BMDP User's Digest (4th edition), plus addendum.
Updates: State NEWS. in the PRINT paragraph for summary of new features.
DATE: 08/18/89  AT 08:02:01
PROGRAM INSTRUCTIONS
/PROBLEM TITLE = 'INDIVIDUAL LOGICODES,NORMALIZED TO 1700,IG7'.
/INPUT FILE = 'CODEINPT.TXT'. VARIABLES ARE 5. FORMAT = FREE.
/VARIABLE NAMES = PKRANGE,PEAKVAL,RAP,GRAY4,ACTUAL.
/TRANSFORM PRC = 91.  IF(PKRANGE EQ 62) THEN PRC = 10.
                      IF(PKRANGE EQ 63) THEN PRC = 11.
                      IF(PKRANGE EQ 64) THEN PRC = 12.
                      IF(PKRANGE EQ 66) THEN PRC = 13.
                      IF(PKRANGE EQ 67) THEN PRC = 14.
                      IF(PKRANGE EQ 68) THEN PRC = 15.
                      IF(PKRANGE EQ 69) THEN PRC = 16.
                      IF(PKRANGE EQ 610) THEN PRC = 17.
                      IF(PKRANGE EQ 611) THEN PRC = 18.
                      IF(PKRANGE EQ 612) THEN PRC = 19.
                      IF(PKRANGE EQ 614) THEN PRC = 20.
                      IF(PKRANGE EQ 72) THEN PRC = 21.
                      IF(PKRANGE EQ 73) THEN PRC = 22.
                      IF(PKRANGE EQ 74) THEN PRC = 23.
                      IF(PKRANGE EQ 78) THEN PRC = 24.
                      IF(PKRANGE EQ 79) THEN PRC = 25.
                      IF(PKRANGE EQ 710) THEN PRC = 26.
                      IF(PKRANGE EQ 711) THEN PRC = 27.
                      IF(PKRANGE EQ 712) THEN PRC = 28.
                      IF(PKRANGE EQ 713) THEN PRC = 29.
                      IF(PKRANGE EQ 714) THEN PRC = 30.
                      IF(PKRANGE EQ 716) THEN PRC = 31.
                      IF(PKRANGE EQ 83) THEN PRC = 32.
                      IF(PKRANGE EQ 84) THEN PRC = 33.
                      IF(PKRANGE EQ 89) THEN PRC = 34.
                      IF(PKRANGE EQ 810) THEN PRC = 35.
                      IF(PKRANGE EQ 811) THEN PRC = 36.
                      IF(PKRANGE EQ 812) THEN PRC = 37.
                      IF(PKRANGE EQ 814) THEN PRC = 38.
                      IF(PKRANGE EQ 815) THEN PRC = 39.
                      IF(PKRANGE EQ 816) THEN PRC = 40.
                      IF(PKRANGE EQ 910) THEN PRC = 41.
                      IF(PKRANGE EQ 912) THEN PRC = 42.
                      IF(PKRANGE EQ 913) THEN PRC = 43.
                      IF(PKRANGE EQ 914) THEN PRC = 44.
                      IF(PKRANGE EQ 916) THEN PRC = 45.
PVC = 92.             IF(PEAKVAL GE 314 AND PEAKVAL LE 335) THEN PVC = 10.
                      IF(PEAKVAL GE 335 AND PEAKVAL LE 370) THEN PVC = 11.
                      IF(PEAKVAL GE 370 AND PEAKVAL LE 405) THEN PVC = 12.
                      IF(PEAKVAL GE 405 AND PEAKVAL LE 440) THEN PVC = 13.
                      IF(PEAKVAL GE 440 AND PEAKVAL LE 475) THEN PVC = 14.
                      IF(PEAKVAL GE 475 AND PEAKVAL LE 510) THEN PVC = 15.
                      IF(PEAKVAL GE 510 AND PEAKVAL LE 545) THEN PVC = 16.
                      IF(PEAKVAL GE 545 AND PEAKVAL LE 580) THEN PVC = 17.
                      IF(PEAKVAL GE 580 AND PEAKVAL LE 615) THEN PVC = 18.
                      IF(PEAKVAL GE 615 AND PEAKVAL LE 650) THEN PVC = 19.
                      IF(PEAKVAL GE 650 AND PEAKVAL LE 685) THEN PVC = 20.
                      IF(PEAKVAL GE 685 AND PEAKVAL LE 720) THEN PVC = 21.
                      IF(PEAKVAL GE 720 AND PEAKVAL LE 755) THEN PVC = 22.
                      IF(PEAKVAL GE 755 AND PEAKVAL LE 790) THEN PVC = 23.
                      IF(PEAKVAL GE 790 AND PEAKVAL LE 825) THEN PVC = 24.
                      IF(PEAKVAL GE 825 AND PEAKVAL LE 860) THEN PVC = 25.
                      IF(PEAKVAL GE 860 AND PEAKVAL LE 895) THEN PVC = 26.
                      IF(PEAKVAL GE 895 AND PEAKVAL LE 930) THEN PVC = 27.
                      IF(PEAKVAL GE 930 AND PEAKVAL LE 955) THEN PVC = 28.
                      IF(PEAKVAL GE 955 AND PEAKVAL LE 1000) THEN PVC = 29.
                      IF(PEAKVAL GE 1000 AND PEAKVAL LE 1035) THEN PVC = 30.
                      IF(PEAKVAL GE 1035 AND PEAKVAL LE 1070) THEN PVC = 31.
                      IF(PEAKVAL GE 1070 AND PEAKVAL LE 1105) THEN PVC = 32.
```

-continued

APPENDIX

|  |  |
|---|---|
|  | IF(PEAKVAL GE 1105 AND PEAKVAL LE 1140) THEN PVC = 33. |
|  | IF(PEAKVAL GE 1140 AND PEAKVAL LE 1175) THEN PVC = 34. |
| ROPC = 93. | IF(ROP GE 0 AND ROP LE 39) THEN ROPC = 10. |
|  | IF(ROP GE 39 AND ROP LE 78) THEN ROPC = 11. |
|  | IF(ROP GE 78 AND ROP LE 118) THEN ROPC = 12. |
|  | IF(ROP GE 118 AND ROP LE 157) THEN ROPC = 13. |
|  | IF(ROP GE 157 AND ROP LE 196) THEN ROPC = 14. |
|  | IF(ROP GE 196 AND ROP LE 236) THEN ROPC = 15. |
|  | IF(ROP GE 236 AND ROP LE 275) THEN ROPC = 16. |
|  | IF(ROP GE 275 AND ROP LE 314) THEN ROPC = 17. |
|  | IF(ROP GE 314 AND ROP LE 354) THEN ROPC = 18. |
|  | IF(ROP GE 354 AND ROP LE 393) THEN ROPC = 19. |
|  | IF(ROP GE 393 AND ROP LE 432) THEN ROPC = 20. |
|  | IF(ROP GE 432 AND ROP LE 472) THEN ROPC = 21. |
|  | IF(ROP GE 472 AND ROP LE 511) THEN ROPC = 22. |
|  | IF(ROP GE 511 AND ROP LE 550) THEN ROPC = 23. |
|  | IF(ROP GE 550 AND ROP LE 590) THEN ROPC = 24. |
|  | IF(ROP GE 590 AND ROP LE 629) THEN ROPC = 25. |
|  | IF(ROP GE 629 AND ROP LE 668) THEN ROPC = 26. |
|  | IF(ROP GE 668 AND ROP LE 708) THEN ROPC = 27. |
| G4C = 94. | IF(GRAY4 EQ 0) THEN G4C = 10. |
|  | IF(GRAY4 GT 0 AND GRAY4 LE 5) THEN G4C = 11. |
|  | IF(GRAY4 GE 5 AND GRAY4 LE 10) THEN G4C = 12. |
|  | IF(GRAY4 GE 10 AND GRAY4 LE 15) THEN G4C = 13. |
|  | IF(GRAY4 GE 15 AND GRAY4 LE 20) THEN G4C = 14. |
|  | IF(GRAY4 GE 20 AND GRAY4 LE 25) THEN G4C = 15. |
|  | IF(GRAY4 GE 25 AND GRAY4 LE 30) THEN G4C = 16. |
|  | IF(GRAY4 GE 30 AND GRAY4 LE 35) THEN G4C = 17. |
|  | IF(GRAY4 GE 35 AND GRAY4 LE 40) THEN G4C = 18. |
|  | IF(GRAY4 GE 40 AND GRAY4 LE 45) THEN G4C = 19. |
|  | IF(GRAY4 GE 45 AND GRAY4 LE 50) THEN G4C = 20. |
|  | IF(GRAY4 GE 50 AND GRAY4 LE 55) THEN G4C = 21. |
|  | IF(GRAY4 GE 55 AND GRAY4 LE 60) THEN G4C = 22. |
|  | IF(GRAY4 GE 60 AND GRAY4 LE 65) THEN G4C = 23. |
|  | IF(GRAY4 GE 65 AND GRAY4 LE 70) THEN G4C = 24. |
|  | IF(GRAY4 GE 70 AND GRAY4 LE 75) THEN G4C = 25. |
|  | IF(GRAY4 GE 75 AND GRAY4 LE 80) THEN G4C = 26. |
|  | IF(GRAY4 GE 80 AND GRAY4 LE 85) THEN G4C = 27. |
|  | IF(GRAY4 GE 85 AND GRAY4 LE 90) THEN G4C = 28. |
|  | IF(GRAY4 GE 90 AND GRAY4 LE 95) THEN G4C = 29. |
|  | IF(GRAY4 GE 95 AND GRAY4 LE 100) THEN G4C = 30. |
|  | IF(GRAY4 GE 100 AND GRAY4 LE 105) THEN G4C = 31. |
|  | IF(GRAY4 GE 105 AND GRAY4 LE 110) THEN G4C = 32. |
|  | IF(GRAY4 GE 110 AND GRAY4 LE 115) THEN G4C = 33. |
|  | IF(GRAY4 GE 115 AND GRAY4 LE 120) THEN G4C = 34. |
|  | IF(GRAY4 GE 120 AND GRAY4 LE 125) THEN G4C = 35. |
|  | IF(GRAY4 GE 125 AND GRAY4 LE 130) THEN G4C = 36. |

/GROUP CODES(ACTUAL) = 1 TO 6.NAMES(ACTUAL)=ALMOND,INSHELL,
HULL,MUDBALL,ROCK,CHIP.
/SAVE FILE='LOGICODE.ALL'.NEW.FORMAT=F.KEEP=PRC,PVC,ROPC,G4C,
ACTUAL.
/PRINT DATA.
/END

What is claimed is:

1. A process for the characterization of histogram data comprising the steps of:
   providing a histogram array having discrete bins for receiving like data, said discrete bins distributed over a discrete range of bin values for receiving individual data counts within those bin values and accumulating those data counts for creation of a histogram;
   selecting at least three attributes from said histogram from an attribute category including, but not limited to, bin range, peak bin, peak bin value, bin value to side of peak, and selected bin value;
   dividing each said selected attribute into a plurality of arbitrary range categories assigning a unique arbitrary code to each said range category, said code constituting a portion of a word for the characterization of said histogram;
   determining for said selected attributes from said histogram attributes the arbitrary codes for each of said selected attributes; and,
   concatenating said arbitrary codes to form unique serial words for describing said histograms.

2. The process of claim 1 and wherein said step of selecting at least three attributes includes bin range, peak bin, peak bin value, bin value to side of peak, and selected bin value.

3. The invention of claim 2 and wherein one of said selected attributes includes said bin value to the right side of peak.

4. The invention of claim 1 and including the step of normalizing said histogram array before selecting said attributes.

5. The invention of claim 1 and wherein said histogram is a gray scale histogram.

6. The process of accumulating unique serial code words for the sorting of acceptable product comprising the steps of:
   providing a video camera for observing a stream of passing product and generating signals indicative of said product for producing product histograms;

for each discrete product item passing said video camera providing a histogram array having discrete bins for receiving like data, said discrete bins distributed over a discrete range of bin values for receiving individual data counts within those bin values and accumulating those data counts for creation of a histogram;

selecting at least three attributes from said histogram from an attribute category including, but not limited to, bin range, peak bin, peak bin value, bin value to side of peak and selected bin value;

dividing each selected attribute into a plurality of arbitrary range categories;

assigning a unique arbitrary code word to each range category, said code word constituting a portion of a unique serial code word for the characterization of said histogram;

determining for said selected attributes from said histogram attributes the arbitrary codes for each of said selected attributes as directed to a particular histogram;

concatenating said arbitrary codes to form a unique serial code for describing said histogram;

writing said code words to a memory;

and passing acceptable product by said video camera to generate signals indicative of said acceptable product for producing a library of said unique serial code words.

7. The process of claim 6 including the step of non-redundantly writing said unique serial code words to a library; and passing said acceptable product by said video camera until said unique serial code words produced by said signals are all redundant whereby said library of unique serial code words for said acceptable product is created.

8. The process of claim 6 and wherein said histogram is a gray scale histogram and said histogram is normalized before said determining step.

9. A process for the classification of acceptable product from look alike unacceptable product comprising in combination;

passing a stream of acceptable and unacceptable product by apparatus including a video camera for creating with respect to said stream a series of histograms for each serial item in said stream;

providing a histogram array having discrete bins for receiving like data, said discrete bins distributed over a discrete range of bin values for receiving individual pixel counts within those bin values and accumulating those data counts for creation of a histogram;

selecting at least three attributes from an attribute category including, but not limited to, bin range peak value, peak bin value, bin value to side of peak and selected bin value;

dividing each select attribute range into a plurality of arbitrary categories;

assigning a unique arbitrary code to each said category, said arbitrary code constituting a portion of a unique serial word for the characterization of each said histogram;

determining for said selected attributes from said histogram the arbitrary code words for each of said selected attributes;

concatenating said arbitrary codes to form unique serial words for describing said histograms;

providing a library of unique serial code words for the classification of articles in said passing serial stream;

comparing each said serial code word to said library for determining whether said unique serial code word is written to said library;

classifying each passing article with respect to said stream based on the comparison with said library.

10. The process of claim 9 and wherein said library contains unique serial code words for acceptable product only.

11. The process of claim 9 and wherein said library contains words for acceptable and unacceptable product.

12. The process of claim 9 can and wherein said library contains classifications for said unacceptable product.

* * * * *